July 14, 1964  J. W. SCHWARTZ  3,140,936
ROTATABLE DEHUMIDIFIER

Filed April 17, 1961  2 Sheets-Sheet 1

INVENTOR.
JAMES W. SCHWARTZ
BY
OSTROLENK, FABER, GERB & SOFFEN
ATTORNEYS

July 14, 1964 J. W. SCHWARTZ 3,140,936
ROTATABLE DEHUMIDIFIER
Filed April 17, 1961 2 Sheets-Sheet 2

INVENTOR.
JAMES W. SCHWARTZ
BY
OSTROLENK, FABER, GERB & SOFFEN
ATTORNEYS

United States Patent Office 3,140,936
Patented July 14, 1964

3,140,936
ROTATABLE DEHUMIDIFIER
James W. Schwartz, 354 W. Echo Lane, Phoenix, Ariz.
Filed Apr. 17, 1961, Ser. No. 103,531
12 Claims. (Cl. 55—179)

My invention relates to a novel dehumidifier, and more particularly relates to a dehumidifier which is particularly useful for small enclosed areas.

Dehumidifiers are well known in the art for use in small areas in which air is to be kept dry, such as food storage drawers, clothes storage closets, chests and drawers, office filing cabinets, tool storage areas, film storage areas and so on.

In accordance with the present invention, a novel dehumidifier is provided which includes a rotatable disk having a plurality of apertures therein which each contain a desiccant. The disk is very thin, and it is movable into a relatively small enclosed volume having a heater element on one side of the disk and an exhaust channel on the other. As portions of the disk move through this area, the heat operates to drive the moisture out of the desiccant and into the moisture exhaust.

It will be noted that the moisture exhausts as a vapor, and that the exhaust area may be isolated from the volume of air to be dried so that the moisture is not reintroduced into the enclosed area. That is, since the unit pumps only moisture, there is no necessity for air flow through the unit so that no new moisture-laden air will enter the operating enclosure.

By using a very thin disk the moisture absorption is, to a large extent, a surface process so that as the small volumes of desiccant are moved adjacent the heater element, there is no need to heat thick sections of desiccant. Furthermore, and since the desiccant is carried in the disk, heat transfer to the desiccant can be by conduction through the metal which is a highly efficient process.

A typically used heater block which may be of aluminum may be provided for the heating action and is preferably carried in such a manner that it normally bears directly against the disk which may be of stainless steel as the disk is rotated past the block. Thus, there is a rubbing action between the heater block and the disk to prevent sealing or other injury to the desiccant surface by dust and other impurities so that full efficiency is maintained.

If the capacity of the device is to be increased, a fan can be provided. In the preferred application of the device to small units, however, moist air circulates by the desiccant containing disk portions outside of the enclosed heating volume by virtue of thermal convection and molecular diffusion.

As pointed out above, the heater block positioned on one side of the disk is enclosed. This enclosure is preferably formed by a simple shield shaped as a box having an open surface adjacent the disk to prevent by-pass evaporation of moisture due to the peripheral heat transfer or slow cooling of the disk. Note that such by-pass evaporation would expel part of the absorbed moisture back into the moisture evaporation space.

All but the enclosed portions of the disk on either side—the heat source containing side and the moisture exhaust side—are exposed to the air volume to be dried. With this type of structure, both the front and back of the disk can be used as an active desiccant surface rather than blocking the entire back surface of the disk for moisture exhaust purposes. Secondly, peripheral heat transfer due to conduction through a disk support plate and back into the disk is eliminated by this construction. For this purpose, the disk support plate preferably is formed of aluminum.

By forming the disk support plate with a port in communication with the exhaust volume, the periphery of the port can be raised to contact the disk. Thus, a moisture and air seal is provided, and in addition, a heat sink is provided for cooling the heated portion of the disk as it slowly rotates past the exhaust opening area.

The exhaust opening in the plate is preferably formed in the shape of a trapezoid so that each opening in the disk will remain in the heated area for the same length of time regardless of its radial position in the disk.

The disk itself is rotated by a motor means which could be a clock-type synchronous gear motor which is geared down to cause the disk to rotate at approximately four revolutions per hour. This speed has been found very effective, and is a good compromise between cycle length, complete desiccant heating and surface wear.

While many desiccants can be used in the disk, it has been found that a very desirable desiccant is formed by bonding alumina powder in the disk holes with sodium silicate in approximately equal parts by weight. After the mixture is placed in the holes and after air drying or baking, the desiccating action of the alumina may be substantially enhanced by application of a saturated calcium chloride solution. An anhydrous calcium sulphate mixed with water to form a paste is also quite effective as a desiccant after baking at 500° F., although it does not have the desired mechanical properties of the sodium silicate bonded alumina.

Accordingly, it is a primary object of this invention to provide a novel dehumidifier.

Another object of this invention is to provide a novel dehumidifier for drying small air volumes.

Yet a further object of this invention is to provide a novel dehumidifier for small volumes wherein a relatively large surface area of desiccant is exposed to the air volume, and small areas of the desiccant surface are subsequently heated to drive the moisture therein to a moisture exhaust system.

A further object of this invention is to provide a dehumidifier for drying small air volumes which is comprised of a thin disk having a plurality of openings therein which carry a desiccant.

Another object of this invention is to provide a dehumidifier formed of a perforated disk having openings therein which contain a desiccant, and to rotate the disk past an enclosed heater member on one surface of the disk and an exhaust port on an adjacent, opposite surface of the disk.

Yet a further object of this invention is to provide a novel perforated disk having a desiccant in the openings thereof wherein a substantial portion of both surfaces of the disk is normally exposed to a volume of air to be dried.

A further object of this invention is to provide a heater block for a novel dehumidifier which normally rides on the surface of a rotated disk having perforations therein which contain a desiccant.

These and other objects of my novel invention will become apparent from the following description when taken in conjunction with the drawings, in which:

FIGURE 2 is a top plan view of the humidifier of FIGURE 1.

FIGURE 3 is a side cross-sectional view of FIGURE 2 taken across the lines 3—3 of FIGURE 2.

FIGURE 4 is a partial side cross-sectional view of FIGURE 2 as seen from the right-hand side of FIGURE 2.

FIGURE 5 is an enlarged cross-sectional view of one of the openings in the rotatable disk.

Figure 1:
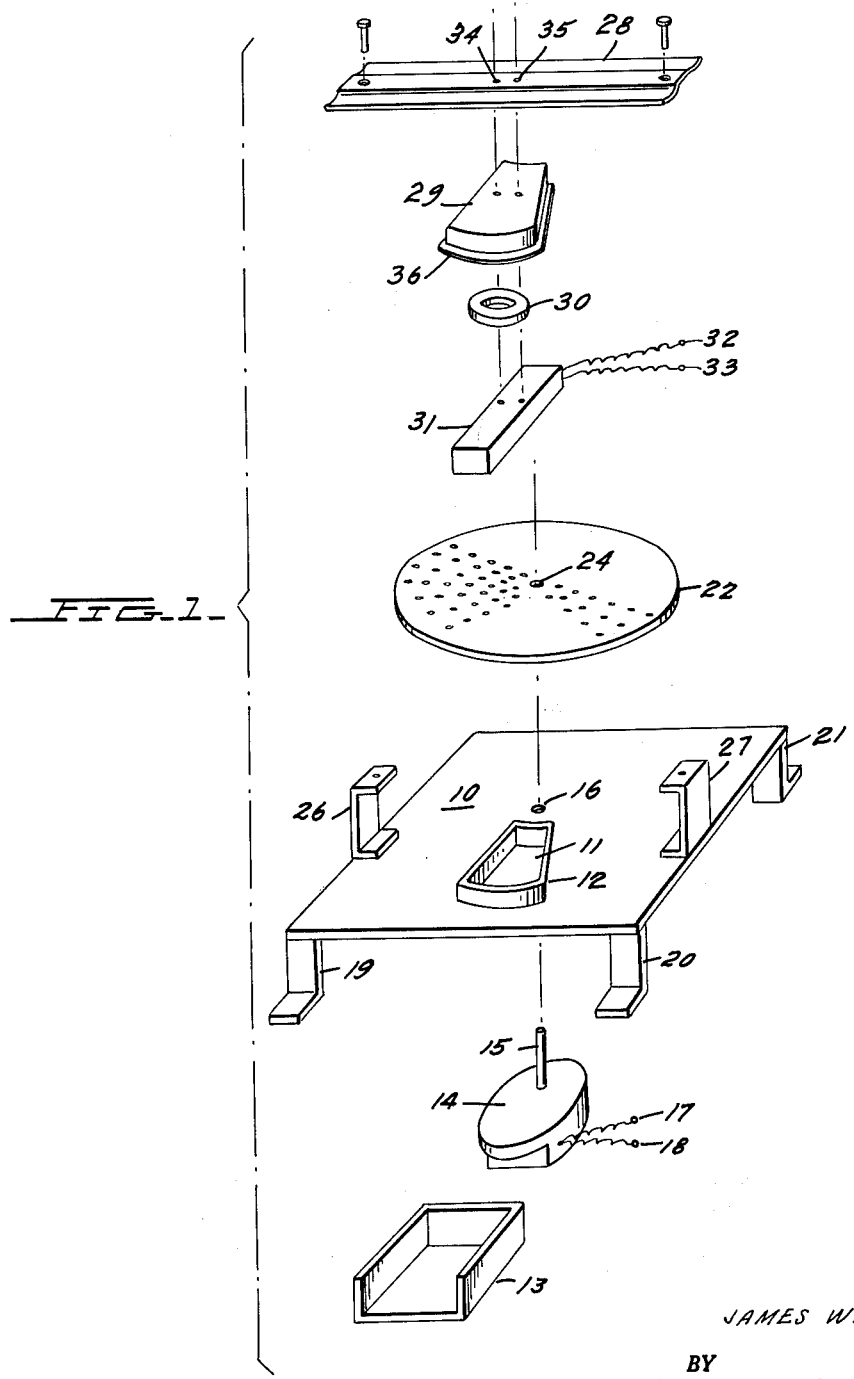
FIGURE 1 is an exploded perspective view of a dehumidifier of the present invention.

Referring now to FIGURES 1 through 4, the dehumidifier includes a main support plate 10 which is preferably of aluminum. As shown in FIGURES 1 and 4, the support plate 10 is provided with a trapezoidal opening 11 surrounded by a cage 12. As shown specifically in FIGURE 3, the cage 12 could be formed as an integral part of plate 10.

A moisture exhaust cup 13, which could be made of sheet metal, is fastened in registry with trapezoidal opening 11 and is secured to plate 10 in any desired manner as by welding. A synchronous gear motor 14 is also secured to the underside of plate 10 so that its rotatable spindle 15 extends through aperture 16 in plate 10. Motor 14 has a pair of terminals 17 and 18 extending therefrom which are connectable to any standard type of plug. Motor 14 may be made in the manner of a clock motor, and its gear ratio is such that spindle 15 is rotated at approximately four revolutions per hour in the preferred embodiment of the invention. Clearly, however, any output speed suitable for a particular application could be used without departing from the invention.

In order to permit plate 10 to serve as the support for the complete unit, it may be provided with support legs shown in FIGURE 1, for example, as support legs 19, 20 and 21 at each corner. However, any desirable type of support could be provided for the unit.

Immediately on top of plate 10, and preferably bearing against the top of cage 12, is a disk 22 having a matrix of perforations therein. The complete disk is perforated, although only portions of the perforations are shown in the drawings for purposes of illustration. The perforations, as best seen in FIGURE 5, and which may be of the order of an eighth of an inch in diameter, and may occupy 50% of the total surface area of the disk, have rounded corners so that a desiccant material 23 in FIGURE 5 may have its surface depressed below the surface of the disk.

Disk 22, in a preferred embodiment of the invention, is formed of stainless steel, and has a diameter of 6 inches and a thickness of 0.030″. The desiccant material 23, as pointed out above, may be a sodium silicate bonded alumina or a baked paste of anhydrous calcium sulphate mixed with water. Generally, however, any type of desiccant medium can be used.

An opening 24 in the center of disk 22 receives spindle 15, as shown in FIGURES 1 and 2, so that disk 22 is rotated with spindle 15. Preferably, as the disk rotates, it will rub on the top of cage 12 so that disk 22 will be in heat conduction relation with respect to cage 12 and large plate 10, so that plate 10 can serve as a heat sink for disk 22.

A pair of protruding support members 26 and 27 are then secured to plate 10, as shown in FIGURES 1 and 4, and carry a spring steel elongated member 28, shown in FIGURES 1 through 4. A central portion of steel spring 28 then receives a cup-shaped heater shield 29 which has a mica washer 30 against its top surface and an aluminum heater block 31 adjacent the opposite surface of washer 30.

The aluminum heater block 31 is of well known construction, and is provided with a pair of terminals 32 and 33 which are connectable to a voltage source which will cause the block 31 to generate heat in the usual manner.

The sub-assembly of the heater shield 29, washer 30 and block 31 may then all be carried from the steel spring 28 by a single fastening structure which could, for example, include screws passing through openings 34 and 35 in steel spring 28 and cooperating openings in the heater shield 29 and aluminum heater block 31. The heater shield 29 is provided at its lower surface with an extending flange 36. Note that the shield 29 may be formed of sheet metal so that such a flange can be easily and economically formed.

The under-surface of flange 36 as seen in FIGURES 3 and 4 rides directly against the upper surface of disk 22 adjacent to port 11 in plate 10. More specifically, the heater shield 29 and heater block 31 are biased to this engaged position by virtue of support spring 28.

Thus, it is seen that an assembly is provided wherein the heater shield 29 on one side of restricted area of disk 22 defines a heating volume, while in registry with this heating volume, and on the other side of the disk, there is an exhaust system including opening 11 and cup 13.

In operation, and as is clear from FIGURES 3 and 4, a substantial area of both sides of disk 25 will be exposed to the air volume to be dried by the dehumidifier. As moisture from the volume to be dried is absorbed by the desiccant 23 in the various openings in disk 22, the desiccant material is rotated into heater shield 29 and adjacent aluminum heater block 31. The heat generated in this enclosed area will cause the very thin desiccant sections to be dried by driving out the moisture therein, which moisture will be driven downwardly through opening 11 in plate 10 and into cup 13 which can be ultimately connected to some external moisture exhaust system which leads outside of the volume to be dried. The speed of rotation of disk 22 is adjusted so that each desiccant-filled opening will remain exposed to the heating action for a long enough time to drive out a sufficient amount of moisture.

In the novel construction set forth above, several novel features have been used. Among these novel features, it has been described that a mica washer 30 is positioned between the aluminum heater block and shield 29. This will prevent heat conduction directly from the block to the shield whereby the shield can run substantially cooler than if the heater block was contained directly thereagainst.

Next, during the heating of the desiccant, and since the desiccant is carried in a stainless steel disk, heat is transferred to the desiccant directly through the metal portions of the disk by conduction. Thus, the heat transfer process is highly efficient.

The use of a thin disk 22 leads to many advantages where, by a "thin disk," I mean a disk having a thickness of the order of $30/1000$ of an inch. The first advantage which has been previously described is that the moisture absorption becomes a surface process so that large masses of desiccant need not be heated when driving moisture out of the desiccant. Secondly, the use of a thin disk will substantially restrict peripheral heat flow through the disk from the heated area to areas external of the heated area. A further advantage is that the total heat capacity of the single disk is quite small, particularly in comparison to the three-dimensional type of "pill box" construction.

In forming the disk 22 of stainless steel, the rubbing action between the heater block 31 and the disk takes place against an effective bearing surface so that wear is relatively small, although heat transfer by conduction is achieved. Further to this, however, the rubbing action will prevent sealing of the desiccant-containing openings by dust, and other foreign matter, so that full efficiency can be maintained over a long period of time. By causing the desiccant surface to be depressed, as shown in FIGURE 5, it is clear that this rubbing action will not gouge the desiccant.

As contrasted to many prior art devices, there is no air flow through the drying unit. That is to say, the unit only pumps moisture since the heat generated by the heating volume enclosed by shield 29 causes the driving of moisture from the desiccant in the holes in registry with the heating volume. Thus, there need be no air flow through the unit which, under normal circumstances, would contain moisture which could be absorbed by the desiccant which is to be dried.

Within the air volume to be dried, air circulation to the exposed portions of the disk was pointed out above as taking place by virtue of thermal convection and molecular diffusion. The hot heater block 31 will, of course, substantially enhance this circulation. This is to be contrasted to the "pill box" type of desiccant holder where forced air circulation is necessary so that there is a dust and other foreign matter accumulation problem.

The shield 29, as well as enclosing a heating volume, will also prevent the by-pass evaporation of moisture due to the peripheral heat transfer or slow cooling of the disk. Such by-pass evaporation would normally expel a part of the absorbed moisture in the desiccant back into the space to be dried, rather than when those openings in the disk are in registry with opening 11.

Although I have described preferred embodiments of my novel invention, many variations and modifications will now be obvious to those skilled in the art, and I prefer therefore to be limited not by the specific disclosure herein but only by the appended claims.

I claim:

1. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; said disk being formed of a thin metallic member; said disk having a thickness of the order of 0.03 inches whereby there is a relatively large exposed surface area of desiccant.

2. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; and a vapor exhaust means; said vapor exhaust means being positioned on the opposite surface of said disk and in registry with said surface portion of said disk adjacent said heating means; said disk having a thickness of the order of 0.03 inches whereby there is a relatively large exposed surface area of desiccant.

3. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; the surfaces of said desiccant in said openings being below the corresponding surface of said disk; said heating means including a heating block riding on the said surface portion of said disk.

4. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; said heating means including a heating block riding on the said surface portion of said disk; and support means for said heating means; said support means including spring biasing means connected to said heating block and biasing said heating block into engagement with the said surface portion of said disk.

5. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; said heating means including a heating block riding on the said surface portion of said disk; and a shield means; said shield means having an open face; said shield means surrounding said heating block and engaging said disk at said open face of said shield means.

6. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; said heating means including a heating block riding on the said surface portion of said disk; and a shield means; said shield means having an open face; said shield means surrounding said heating block and engaging said disk at said open face of said shield means; and an insulating barrier; said insulating barrier being interposed between said shield means and said heating block.

7. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; said heating means including a heating block riding on the said surface portion of said disk; and a shield means; said shield means having an open face; said shield means surrounding said heating block and engaging said disk at said open face of said shield means; and an insulating barrier; said insulating barrier being interposed between said shield means and said heating block; said insulating barrier comprising a mica washer.

8. A dehumidifier; said dehumidifier including a disk, rotating means connected to said disk for rotating said disk, and a heating means positioned adjacent a surface portion of said disk; said disk having a plurality of openings therein; each of said openings having a desiccant contained therein; said heating means including a heating block riding on the said surface portion of said disk; and a shield means; said shield means having an open face; said shield means surrounding said heating block and engaging said disk at said open face of said shield means; and an insulating barrier; said insulating barrier being interposed between said shield means and said heating block; each of said shield means, insulating barrier, and heating block being secured to a common support means; said common support means comprising a flexible member; said flexible member biasing said heating block toward engagement with the said surface of said disk.

9. A dehumidifier; said dehumidifier including a disk; rotating means connected to said disk for rotating said disk, and a heating means positioned adjacent a surface portion of said disk; said disk having a plurality of openings therein; each of said openings having a desiccant contained therein; said heating means including a heating block riding on the said surface portion of said disk; and a shield means; said shield means having an open face; said shield means surrounding said heating block and engaging said disk at said open face of said shield means; and a vapor exhaust means; said vapor exhaust means being positioned on the opposite surface of said disk and in registry with said surface portion of said disk adjacent said heating means; said shield means and said vapor exhaust means defining an enclosed drying area isolated from the air to be dried by said dehumidifier.

10. A rotatable disk for a dehumidifier; said rotatable disk comprising a thin metallic disk having a plurality of openings therethrough; each of said openings having a desiccant therein; said disk having a thickness of the order of 0.03 inches whereby there is a relatively large exposed surface area of desiccant.

11. A rotatable disk for a dehumidifier; said rotatable disk comprising a thin metallic disk having a plurality of openings therethrough; each of said openings having a desiccant therein; said disk being of stainless steel; said disk having a thickness of the order of 0.03 inches whereby there is a relatively large exposed surface area of desiccant.

12. A rotatable disk for a dehumidifier; said rotatable disk comprising a thin metallic disk having a plurality of openings therethrough; each of said openings having a desiccant therein; said disk being of stainless steel; said disk having a thickness of the order of 0.03 inches.

References Cited in the file of this patent

UNITED STATES PATENTS

| | | |
|---|---|---|
| 2,852,326 | Westlake | Sept. 16, 1958 |
| 3,009,540 | Munters | Nov. 21, 1961 |
| 3,023,835 | Brashear | Mar. 6, 1962 |